Oct. 6, 1925.
F. B. COOK
NUTCRACKER
Filed Feb. 13, 1923
1,556,424
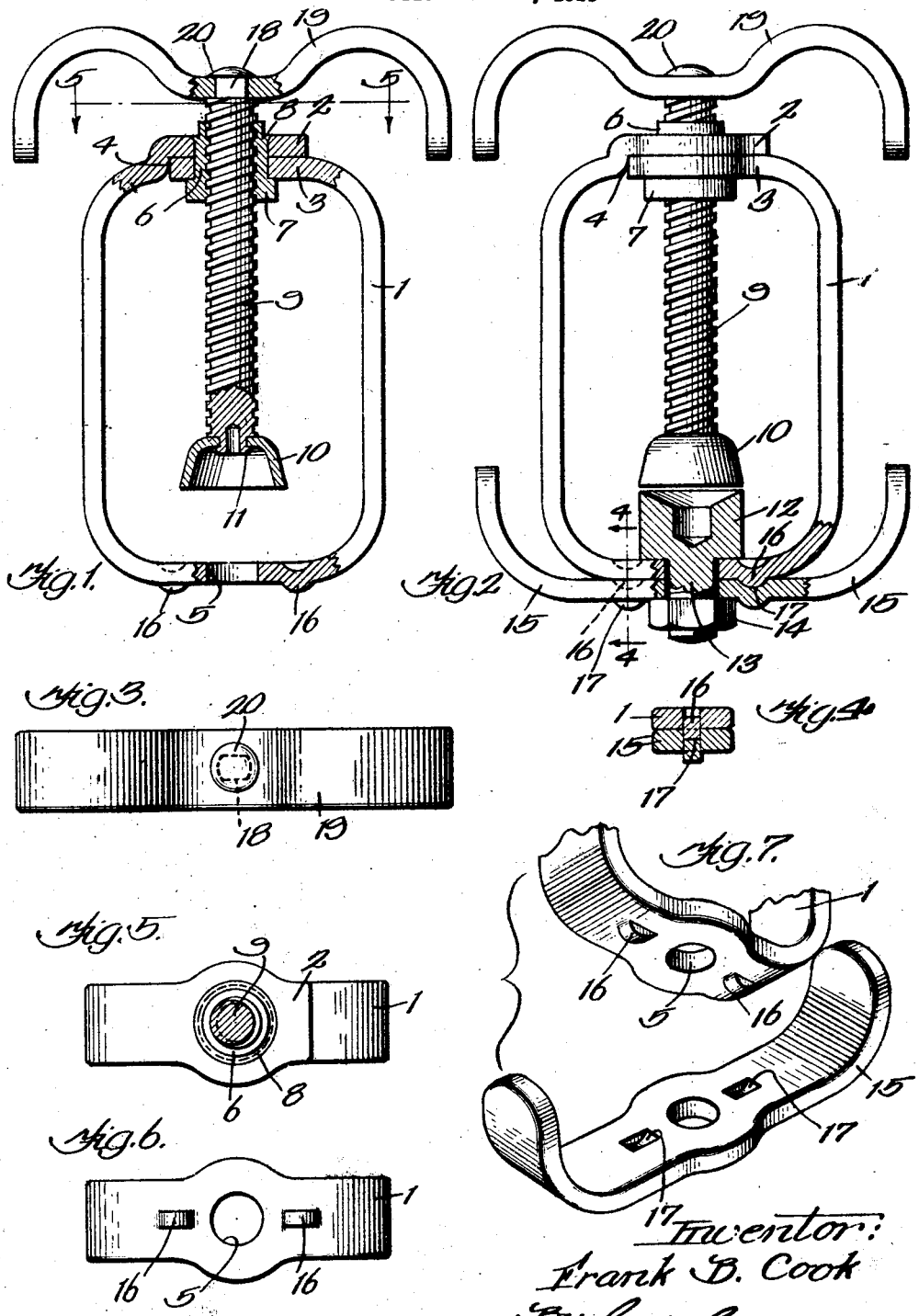

Patented Oct. 6, 1925.

1,556,424

UNITED STATES PATENT OFFICE.

FRANK B. COOK, OF CHICAGO, ILLINOIS.

NUTCRACKER.

Application filed February 13, 1923. Serial No. 618,793.

*To all whom it may concern:*

Be it known that I, FRANK B. COOK, a citizen of the United States, residing at Chicago, in the county of Cook and State of Illinois, have invented a certain new and useful Improvement in Nutcrackers, of which the following is a full, clear, concise, and exact description.

My invention relates to nut-crackers and has a number of objects and advantages in view.

A nut-cracker formed in accordance with one feature of my invention includes a frame formed of strap metal, and a screw projecting through and in threaded assembly with said frame, the inner end of said screw having a nut receiving seat thereon. This frame desirably has overlapping ends that are formed with holes which are aligned with each other and the opposite portion of the frame that constitutes a seat for the nuts. The assembly of the screw with the frame is desirably effected by means of an interiorly threaded bushing, virtually forming a part of the frame, through which the screw passes and with which the screw has threaded engagement, this bushing also desirably serving as a rivet to hold the overlapping ends of the frame in rigid assembly. The screw is desirably provided with a gripping head formed of strap metal bent upon each side of the screw to increase the breadth of the head. The frame is also desirably provided with one or more gripping wings opposite the place of assembly of the frame and screw.

Another feature of the invention resides in the provision of a nut seat preferably having a stem received in a hole that is formed in the frame. This stem is preferably threaded and projects sufficiently far through the hole to enable the application of a nut thereto upon the exterior of the frame whereby said nut seat and frame are separably assembled. When nuts of smaller size are to be cracked this removable seat is employed. When nuts of larger size are to be cracked this seat is removed, the metal surrounding the hole in the frame itself then serving as a seat for the nuts.

The invention will be more fully explained by reference to the accompanying drawing in which Fig. 1 is a longitudinal sectional view of a nut cracker constructed in accordance with the preferred embodiment of the invention, this figure, however, lacking the gripping wings upon the frame and the separable nut seat; Fig. 2 is a view, partially in elevation and partially in section, of the complete nut-cracker, this figure illustrating the gripping wings upon the frame and the removable nut seat; Fig. 3 is a plan view of the nut-cracker as it appears in Fig. 1; Fig. 4 is a sectional view on line 4—4 of Fig. 2; Fig. 5 is a sectional view on line 5—5 of Fig. 1; Fig. 6 is an end view of the frame of the nut-cracker as it appears in Fig. 1; and Fig. 7 is a view in perspective illustrating a portion of the frame and the gripping wings that are preferably separably applicable thereto.

Like parts are indicated by similar characters of reference throughout the different figures.

The nut-cracker illustrated includes a frame 1 formed of a piece of strap metal whose ends 2 and 3 overlap, the end 2 of the piece of strap metal being desirably offset from the general contour of the frame a distance equal to the thickness of the strap metal whereby the end 3 of the piece of strap metal may be disposed within the general contour of the frame, this end abutting against the shoulder 4 which results from the offsetting of the end 2. The overlapping ends 2 and 3 are formed with holes that are aligned with each other and with the opposite portion 5 of the frame that constitutes a seat for the nuts to be cracked. The interiorly threaded bushing 6 is passed through the holes in the overlapping ends 2 and 3, this bushing having a head 7 at one end, preferably its inner end and being expanded at its other end as indicated at 8 to bring the bushing into clamping engagement with overlapping ends of the frame, the bushing practically constituting a part of the frame. A screw 9 passes through and is in threaded engagement with the bushing, the inner end of the set screw being provided with any suitable form of nut receiving seat to co-operate with the end seat 5 upon the frame.

The nut seat upon the screw which I have shown is in the form of a cup 10 swiveled or riveted upon the inner end of the screw by means of the flange portion 11 of the screw.

The nut seat 5 upon the frame is desirably formed by an aperture in the frame that is aligned with the nut seat 10 and the screw 9.

The nutcracker thus far described is adapted to crack nuts of larger size. If nuts of smaller size are to be cracked a supplemental nut seat 12 may be provided. This latter nut seat extends laterally of the opening at 5 has a threaded stem 13 which passes through the opening. This stem projects upon the exterior of the frame and there receives a clamping nut 14. If desired, the frame may be provided with gripping wings 15 which are preferably formed from a single piece of strap metal having a perforation at its mid-portion through which the stem 13 passes whereby these wings may be separably assembled with the frame of the cracker. In order to prevent turning movement in the wings upon the nut frame said frame may be provided with lugs 16 upon opposite sides of the hole at 5 and the piece of metal out of which the wings 15 are formed may be provided with depressions 17 that receive the lugs 16. The piece of metal out of which said wings are formed is desirably bent at each end to increase the breadth thereof whereby the device is made more adaptable to the hands than if the wings were in straight alignment.

The outer end of the screw is desirably provided with a reduced extension 18 flattened upon its side to make the same oblong. This screw extension 18 is passed through a similarly shaped hole in the gripping head 19, this gripping head being secured between the shoulder at the outer end of the screw and the riveting head 20. The gripping head 19 is desirably formed of strap metal bent upon each side of the screw to increase the breadth of the head.

The strap metal employed in the construction of the nutcracker of my invention desirably has rounded corners to enable the cracker to be easily grasped. The employment of the strap metal illustrated and the method of assembling the overlapping ends thereof shown permits of the construction of a simple and cheap nutcracker and one wherein the nut being cracked may be grasped by the hand while the nut cracker is being used thereon.

While I have herein shown and particularly described the preferred embodiment of my invention I do not wish to be limited to the precise details of construction shown as changes may readily be made without departing from the spirit of my invention, but having thus described by invention I claim as new and desire to secure by Letters Patent the following:—

1. A nut cracker including a frame formed of a piece of strap metal whose ends overlap and are formed with holes that are aligned with each other and the opposite portion of the frame that constitutes a seat for the nuts; and a screw projecting through said holes and in threaded assembly with said frame at said holes, the inner end of said screw having a nut receiving seat thereon.

2. A nut cracker including a frame formed of a piece of strap metal whose ends overlap and are formed with holes that are aligned with each other; an interiorly threaded bushing received in said holes; and a screw passing through and in threaded engagement with said bushing, the inner end of said screw having a nut receiving seat thereon.

3. A nut cracker including a frame formed of a piece of strap metal whose ends overlap and are formed with holes that are aligned with each other; an interiorly threaded bushing received in said holes, said bushing having a head at one end engaging one of the overlapping ends of the frame and expanded at its other end into clamping engagement with the other overlapping end of the frame; and a screw passing through and in threaded engagement with said bushing, the inner end of said screw having a nut receiving seat thereon.

4. A nut cracker including a frame formed of a piece of strap metal; an interiorly threaded bushing, said bushing having a head at one end engaging one side of the frame and expanded at its other end into clamping engagement with the other side of the frame; and a screw passing through and in threaded engagement with said bushing, the inner end of said screw having a nut receiving seat thereon.

5. A nut cracker including a frame; a screw passing through and in threaded engagement with said frame and having a nut receiving seat upon its inner end, the frame having gripping wings opposite the place of assembly of the frame and screw and formed in a unitary structure that has separable engagement with the frame; and a clamping device for assembling said wings and frame.

6. A nut cracker including a frame; a screw passing through and in threaded engagement with said frame and having a nut receiving seat upon its inner end, said frame having a hole therethrough opposite the place of assembly of the frame and screw for receiving ends of nuts that are to be cracked; a nut seat having a stem removably received in said hole; and a nut threaded upon the outer end of said stem to clamp said nut seat and frame together, the nut seat extending laterally of said hole.

In witness whereof, I hereunto subscribe my name this 30th day of January, A. D. 1923.

FRANK B. COOK.